(12) United States Patent
Yasui et al.

(10) Patent No.: US 11,370,420 B2
(45) Date of Patent: Jun. 28, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuji Yasui, Wako (JP); Umiaki Matsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 16/822,050

(22) Filed: Mar. 18, 2020

(65) Prior Publication Data

US 2020/0307569 A1 Oct. 1, 2020

(30) Foreign Application Priority Data

Mar. 28, 2019 (JP) .............................. JP2019-062194

(51) Int. Cl.
*B60W 30/09* (2012.01)
*B60W 60/00* (2020.01)
*G06V 20/58* (2022.01)

(52) U.S. Cl.
CPC ...... *B60W 30/09* (2013.01); *B60W 60/00274* (2020.02); *G06V 20/58* (2022.01)

(58) Field of Classification Search
None
See application file for complete search history.

(56) References Cited

U.S. PATENT DOCUMENTS

| 2015/0210312 A1* | 7/2015 | Stein | H04N 7/183 701/41 |
|---|---|---|---|
| 2019/0270448 A1* | 9/2019 | Takasao | B60W 30/0956 |
| 2020/0285246 A1* | 9/2020 | Rakshit | G05D 1/0285 |

FOREIGN PATENT DOCUMENTS

| JP | 2001-191876 | 7/2001 |
|---|---|---|
| JP | 2006-293539 | 10/2006 |
| JP | 2007-041788 | 2/2007 |
| JP | 2017-142145 | 8/2017 |
| WO | 2018/179275 | 10/2018 |

OTHER PUBLICATIONS

Japanese Office Action for Japanese Patent Application No. 2019-062194 dated May 10, 2022.

* cited by examiner

*Primary Examiner* — James J Lee
*Assistant Examiner* — David Hatch
(74) *Attorney, Agent, or Firm* — Amin, Turocy & Watson, LLP

(57) ABSTRACT

A vehicle control device comprising a processor configured to recognize a surrounding environment of a vehicle and perform driving control according to speed control and steering control of the vehicle on the basis of a recognition result of the recognizer. The processor is configured to recognize a physical object present on a route of the vehicle on the basis of an image representing a space in a traveling direction of the vehicle and determine whether or not the physical object is a specific obstacle that hinders traveling in a lane where the vehicle is currently traveling. The processor is further configured to start a lane change execution possibility determination before determining whether the specific obstacle hinders travel or simultaneously with a start of the determining in a case where the physical object and the vehicle is allowed to make the lane change.

8 Claims, 8 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-062194, filed Mar. 28, 2019, the content of which is incorporated herein by reference.

BACKGROUND OF THE INVENTION

Field of the Invention

The present invention relates to a vehicle control device, a vehicle control method, and a storage medium.

Description of Related Art

Conventionally, technology for detecting a physical object present in a traveling direction of a vehicle using a radar device and identifying whether the physical object particularly hinders the vehicle also when the vehicle travels while riding over the physical object or whether it is necessary to avoid contact with the physical object has been disclosed (for example, see Japanese Unexamined Patent Application, First Publication No. 2001-191876).

However, in the technology disclosed in Japanese Unexamined Patent Application, First Publication No. 2001-191876, only information of the physical object is used for an operation of a safety device and a process to be appropriately performed in relation to driving control of the vehicle is not sufficiently taken into account.

SUMMARY OF THE INVENTION

The present invention has been made on the basis of the above-described problem recognition and an objective of the present invention is to provide a vehicle control device, a vehicle control method, and a storage medium capable of causing physical object detection and driving control to be appropriately in cooperation with each other.

A vehicle control device, a vehicle control method, and a storage medium according to the present invention adopt the following configurations.

(1): According to an aspect of the present invention there is provided a vehicle control device including: a recognizer configured to recognize a surrounding environment of a vehicle; and a driving controller configured to perform driving control according to speed control and steering control of the vehicle on the basis of a recognition result of the recognizer, wherein the recognizer includes a physical object recognizer configured to recognize a physical object present on a route of the vehicle on the basis of an image acquired from an imaging unit configured to image a space in a traveling direction of the vehicle; and an obstacle determiner configured to determine whether or not the physical object recognized by the physical object recognizer is a specific obstacle that hinders traveling in a lane where the vehicle is currently traveling, and wherein the driving controller is configured to start a lane change execution possibility determination before the obstacle determiner makes the determination or simultaneously with a start of the determination in a case where the physical object recognizer has recognized the physical object and the vehicle is allowed to make the lane change.

(2): In the above-described aspect (1), the driving controller is configured to cause the determination of the obstacle determiner to be stopped in a case where a result of the lane change execution possibility determination indicates that the lane change is determined to be executed.

(3): In the above-described aspect (1), the driving controller is configured to start braking of the vehicle with a first amount of braking in a case where the determination of the obstacle determiner has been started.

(4): In the above-described aspect (1), the driving controller is configured to start braking of the vehicle with a second amount of braking in a case where a result of the lane change execution possibility determination indicates that execution of the lane change is determined to be impossible.

(5): In the above-described aspect (3), the obstacle determiner is configured to derive a degree of hindrance at which the specific obstacle hinders the traveling of the vehicle in a case where the physical object is determined to be the specific obstacle, and the driving controller is configured to brake the vehicle with a third amount of braking that has a larger braking force in a case where the degree of hindrance is greater than or equal to a predetermined degree.

(6): In the above-described aspect (5), the driving controller is configured to cause the vehicle to travel under a condition that a central portion of the vehicle in a vehicle width direction passes above the specific obstacle in a case where the degree of hindrance is less than the predetermined degree.

(7): In the above-described aspect (6), the driving controller is configured to permit the traveling of the vehicle under a condition that any position on the vehicle in the vehicle width direction passes above the specific obstacle in a case where the degree of hindrance is less than the predetermined degree and is also less than or equal to a predetermined second degree.

(8): In the above-described aspect (6), the driving controller is configured to resume the lane change execution possibility determination in a case where the obstacle determiner determines that the physical object is a physical object for predicting a cause by which traveling is disabled in front of the vehicle in the traveling direction.

(9): According to an aspect of the present invention, there is provided a vehicle control method using a computer including: recognizing a surrounding environment of a vehicle; performing driving control according to speed control and steering control of the vehicle on the basis of a recognition result; recognizing a physical object present on a route of the vehicle on the basis of an image acquired from an imaging unit configured to image a space in a traveling direction of the vehicle; determining whether or not the recognized physical object is a specific obstacle that hinders traveling in a lane where the vehicle is currently traveling; and starting a lane change execution possibility determination before the determination is made or simultaneously with a start of the determination in a case where the physical object has been recognized and the vehicle is allowed to make the lane change.

(10): According to an aspect of the present invention, there is provided a computer-readable non-transitory storage medium storing a program for causing a computer of a vehicle control device to: recognize a surrounding environment of a vehicle; perform driving control according to speed control and steering control of the vehicle on the basis of a recognition result; recognize a physical object present on a route of the vehicle on the basis of an image acquired from an imaging unit configured to image a space in a traveling direction of the vehicle; determine whether or not the recognized physical object is a specific obstacle that hinders traveling in a lane where the vehicle is currently traveling; and start a lane change execution possibility determination before the determination is made or simultaneously with a start of the determination in a case where the physical object has been recognized and the vehicle is allowed to make the lane change.

According to the above-described aspects (1) to (10), it is possible to cause physical object detection and driving control to be appropriately in cooperation with each other.

DETAILED DESCRIPTION OF THE INVENTION

Embodiments of a vehicle control device, a vehicle control method, and a storage medium of the present invention will be described below with reference to the drawings. Although a case in which left-hand traffic regulations are applied will be described, it is only necessary to reverse the left and right when right-hand traffic regulations are applied.
[Overall Configuration]

Figure 1:
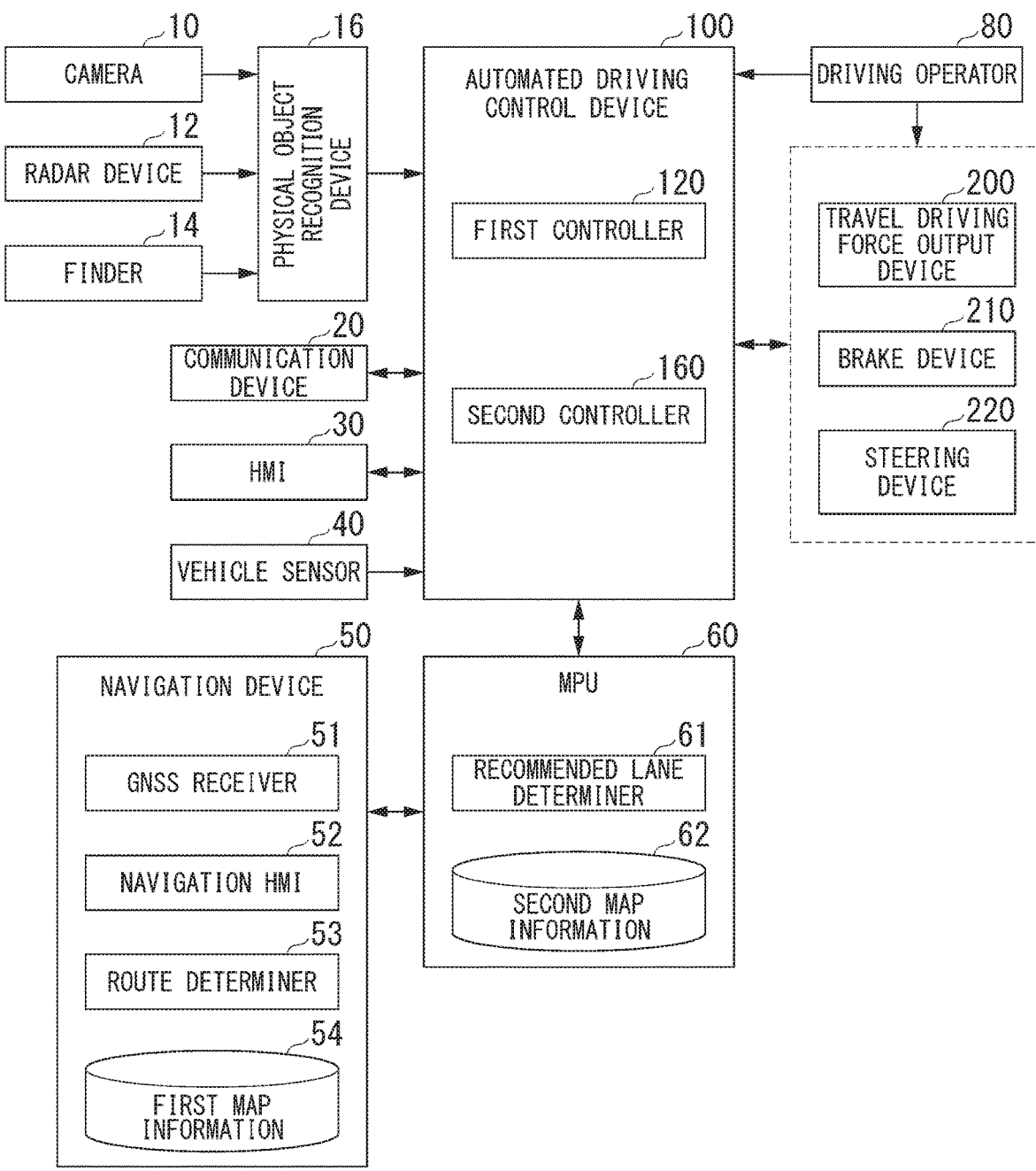
FIG. 1 is a configuration diagram of a vehicle system using a vehicle control device according to an embodiment.

FIG. 1 is a configuration diagram of a vehicle system 1 using a vehicle control device according to an embodiment. A vehicle equipped with the vehicle system 1 is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

For example, the vehicle system 1 includes a camera 10, a radar device 12, a finder 14, a physical object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example, a part of the configuration may be omitted, and another configuration may be further added.

For example, the camera 10 is a digital camera using a solid-state imaging element such as a charge coupled device (CCD) or a complementary metal oxide semiconductor (CMOS). The camera 10 is attached to any position on the vehicle (hereinafter, a host vehicle M) on which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera. The camera 10 is an example of an "imaging unit".

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and speed of the physical object in a frequency modulated continuous wave (FM-CW) scheme.

The finder 14 is a light detection and ranging (LIDAR) finder. The finder 14 radiates light to the vicinity of the host vehicle M and measures scattered light. The finder 14 detects a distance to an object on the basis of time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle system 1.

The communication device 20 communicates with another device present in the vicinity of the host vehicle M or communicates with various types of servers via a wireless base station using, for example, a cellular network or a Wi-Fi network, Bluetooth (registered trademark), dedicated short range communication (DSRC), or the like.

The HMI 30 presents various types of information to an occupant of the host vehicle M and receives an input operation of the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels in from the left. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/zip code), facility information, telephone number information, and the like. The second map information 62 may be updated at any time when the communication device 20 communicates with another device.

For example, the driving operator 80 includes an accelerator pedal, a brake pedal, a shift lever, a steering wheel, a steering wheel variant, a joystick, and other operation elements. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120 and a second controller 160. The first controller 120 and the second controller 160 are implemented, for example, by a hardware processor such as a central processing unit (CPU) executing a program (software). Some or all of these components are implemented, for example, by hardware (a circuit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or a flash memory of the automated driving control device 100 (a storage device including a non-transitory storage medium) or may be installed in the HDD or the flash memory of the automated driving control device 100 when the program is stored in a removable storage medium such as a DVD or a CD-ROM and the storage medium (the non-transitory storage medium) is mounted in a drive device.

Figure 2:
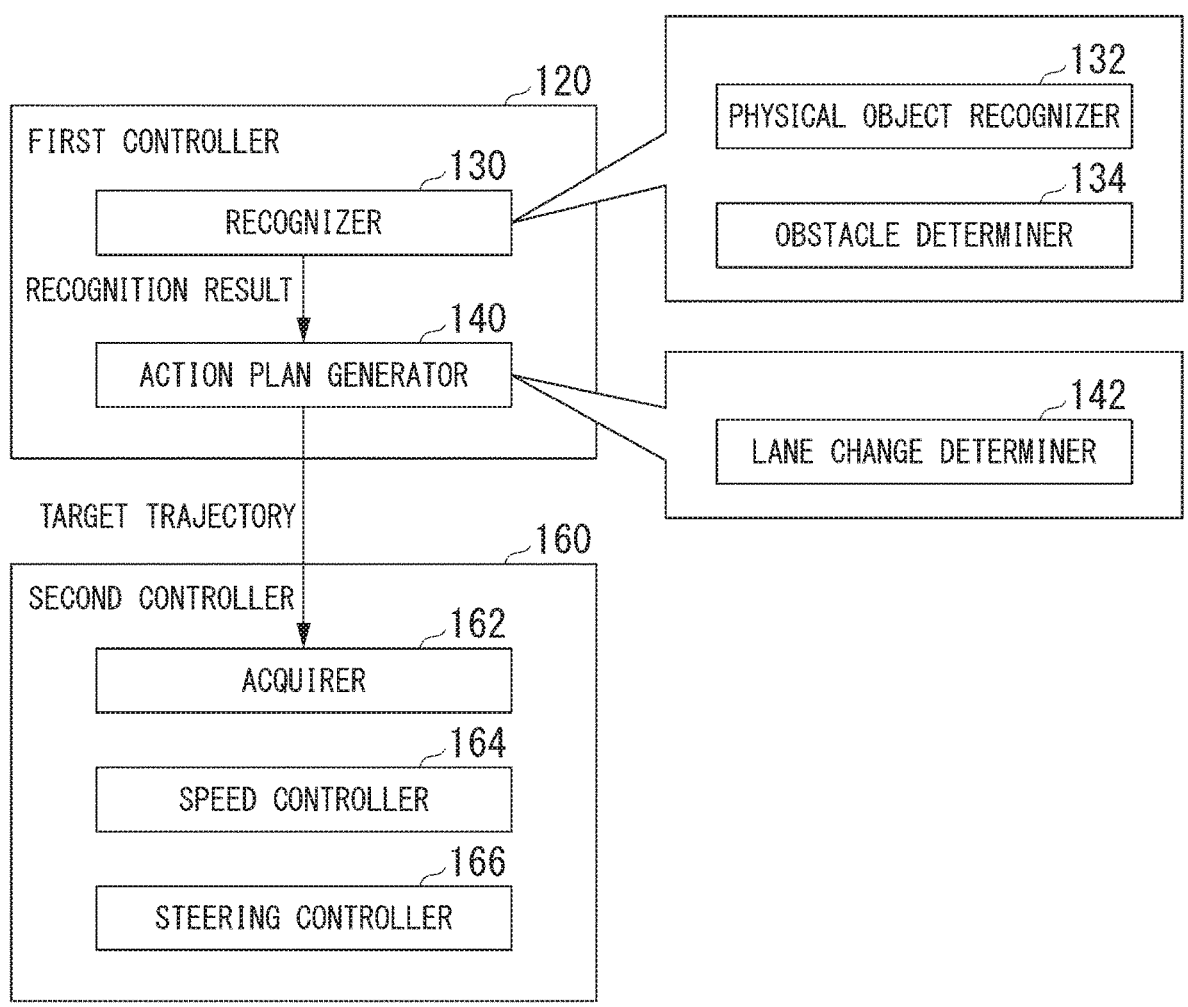
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured. A combination of the action plan generator 140 and the second controller 160 is an example of a "driving controller".

The recognizer 130 recognizes a state such as a position, velocity, or acceleration of a physical object present in the vicinity of the host vehicle M on the basis of information input from the camera 10, the radar device 12, and the finder 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize a travel lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the travel lane is recognized, the recognizer 130 recognizes a position or orientation of the host vehicle M with respect to the travel lane. For example, the recognizer 130 may recognize a gap of a reference point of the host vehicle M from the center of the lane and an angle formed with respect to a line connecting the center of the lane in the travel direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The recognizer 130 includes, for example, a physical object recognizer 132 and an obstacle determiner 134.

The physical object recognizer 132 sequentially acquires images (hereinafter, referred to as images IM) in which the space in the traveling direction of the host vehicle M is periodically imaged by the camera 10 and detects and recognizes a physical object present on the route of the host vehicle M shown in each of a plurality of time-series images IM that have been acquired. At this time, the physical object recognizer 132 performs a process of converting each of the acquired images IM into a low-resolution image and recognizing the physical object using an image with a state of reduced image quality (hereinafter, a low-quality image IML). Thereby, the physical object recognizer 132 reduces a processing load in the process of recognizing the physical object present on the route of the host vehicle M. The physical object recognizer 132 may use, for example, an algorithm of a convolutional neural network (CNN) or the like, or may perform a filtering process or the like, as a conversion method when the image IM is converted into the low-quality image IML. The physical object recognizer 132 may be configured to recognize the physical object present on the route of the host vehicle M by correcting a motion of the physical object included in the low-quality image IML according to each image IM acquired in time series, i.e., by correcting a blur.

The physical object recognizer 132 does not determine physical objects that are unlikely to hinder the traveling of the host vehicle M such as other vehicles which are traveling ahead in a lane that is the same as a lane where the host vehicle M is currently traveling, facilities such as manholes originally installed on the road, and pebbles as recognition targets. That is, the physical object recognizer 132 recognizes a physical object that is abnormally present on the road and is likely to hinder the traveling of the host vehicle M (for example, a falling object such as cloth, a plastic bag, or a corrugated cardboard box) as a target. The physical object recognizer 132 may detect a physical object that is likely to hinder the traveling of the host vehicle M, for example, using an algorithm such as an optical flow.

When a physical object which is present on the route of the host vehicle M and which is likely to hinder the traveling thereof is recognized, the physical object recognizer 132 outputs information indicating that the physical object has been recognized and information of a position of an area within a low-quality image IML including the recognized physical object (hereinafter, a physical object recognition area A) or the like to the obstacle determiner 134. The physical object recognizer 132 also outputs information indicating that the physical object has been recognized to the action plan generator 140.

When the information indicating that the physical object has been recognized is input from the physical object recognizer 132, the obstacle determiner 134 acquires an image IM captured by the camera 10, i.e., an original image whose image quality has not been reduced (hereinafter, a high-quality image IMH), and determines whether or not a physical object recognized by the physical object recognizer 132 is an obstacle that hinders the traveling of the host vehicle M (hereinafter, a specific obstacle) using the acquired high-quality image IMH. At this time, the obstacle determiner 134 performs a detailed analysis process of extracting only an area where the recognized physical object is imaged within the high-quality image IMH on the basis of the information of the position of a physical object recognition area A output from the physical object recognizer 132 and analyzing a type of physical object within the area in detail. For example, the obstacle determiner 134 analyzes characteristics of the physical object such as a material and texture of the physical object recognized by the physical object recognizer 132 in the detailed analysis process on the physical object. The obstacle determiner 134 generally determines whether or not a physical object is a specific obstacle to be avoided by the host vehicle M for traveling together with hardness and weight estimated on the basis of a result of analyzing the characteristics of the physical object as well as a size and a shape of the physical object recognized by the physical object recognizer 132. When it is analyzed that the material of the physical object is, for example, cloth, vinyl, or the like, and that the physical object is for example, simply in a swelling state from the texture of the physical object, the obstacle determiner 134 determines that the physical object recognized by the physical object recognizer 132 is a light physical object. When it is analyzed that the material of the physical object is, for example, earthenware such a brick or porcelain, the obstacle determiner 134 determines that the physical object recognized by the physical object recognizer 132 is a rigid physical object or a heavy physical object.

When it is determined that the physical object recognized by the physical object recognizer 132 is a specific obstacle, the obstacle determiner 134 derives a degree at which the specific obstacle hinders the traveling of the host vehicle M (hereinafter, a degree of hindrance). The obstacle determiner 134 derives, for example, a proportion of an influence on the host vehicle M when the host vehicle M is traveling at a position where the specific obstacle is present, as the degree of hindrance.

The obstacle determiner 134 outputs a result of determining the specific obstacle, i.e., information indicating whether or not the physical object recognized by the physical object recognizer 132 is the specific obstacle, and the derived degree of hindrance, to the action plan generator 140. When it is not possible to identify the specific obstacle as the result of determining the specific obstacle but the physical object is a physical object for predicting a cause by which traveling is disabled, the obstacle determiner 134 outputs information indicating the physical object for predicting the cause by which traveling is disabled to the action plan generator 140 together with the result of determining the specific obstacle or the degree of hindrance. The "cause by which traveling is disabled" refers to a cause estimated to be likely to make it difficult for the host vehicle M to continue traveling, for example, when a malfunctioning vehicle is stopped in front. The "physical object for predicting the cause by which traveling is disabled" refers to, for example, a physical object from which it is possible to infer the existence of the cause by which traveling is disabled such as a smoke candle indicating that a malfunctioning vehicle is stopped in front or a first item of cargo such as a plurality of same corrugated cardboard boxes scattered by a collapse of cargo occurring in another vehicle that has previously passed.

The action plan generator 140 generates a future target trajectory along which the host vehicle M automatedly travels so that the host vehicle M can generally travel in the recommended lane determined by the recommended lane determiner 61 and further cope with a surrounding situation of the host vehicle M. For example, the target trajectory includes a speed element. For example, the target trajectory is represented by sequentially arranging points (trajectory points) at which the host vehicle M is required to arrive. The trajectory point is a point where the host vehicle M is required to reach for each predetermined traveling distance (for example, about several meters [m]) along a road. In addition, a target speed and target acceleration for each predetermined sampling time (for example, about several tenths of a second [sec]) are generated as parts of the target trajectory. The trajectory point may be a position at which the host vehicle M is required to arrive at the sampling time for each predetermined sampling time. In this case, information about the target speed or the target acceleration is represented by an interval between the trajectory points.

The action plan generator 140 may set an automated driving event when the target trajectory is generated. The automated driving event includes a constant-speed traveling event, a low-speed following event, a lane change event, a branching event, a merging event, a takeover event, and the like. The action plan generator 140 generates a target trajectory according to the activated event.

The action plan generator 140 includes a lane change determiner 142.

When information indicating that the physical object has been recognized is input from the physical object recognizer 132, the lane change determiner 142 determines whether or not a lane in which the host vehicle M is currently traveling can be changed. When the lane change determiner 142 determines the possibility of the lane change, a surrounding environment of the host vehicle M recognized by the recognizer 130 such as the presence or absence of another vehicle which is traveling in an adjacent lane is checked. When it is determined that the lane change can be executed, the lane change determiner 142 causes the obstacle determiner 134 to stop the determination of the specific obstacle. This is because the physical object recognized by the physical object recognizer 132 is avoided due to the lane change and therefore it is not necessary to subsequently determine whether or not the physical object is a specific obstacle.

The action plan generator 140 generates a target trajectory in accordance with a specific obstacle determination result of the obstacle determiner 134 and a result of determining whether or not the lane change can be executed in the lane change determiner 142. When the lane change determiner 142 determines that the lane change can be executed, the action plan generator 140 generates a target trajectory for changing the lane in which the host vehicle M is currently traveling. When the lane change determiner 142 determines that the lane change cannot be executed, the action plan generator 140 generates the target trajectory on the basis of the specific obstacle determination result and the degree of hindrance input from the obstacle determiner 134.

The action plan generator 140 does not change a route to secure a period of time required for the obstacle determiner 134 to determine the specific obstacle, but may determine a speed element of the target trajectory for causing the host vehicle M to travel at a reduced speed. For example, when the specific obstacle determination of the obstacle determiner 134 has been started, the action plan generator 140 may determine a target speed value for causing the host vehicle M to be braked with a first amount of braking and causing the host vehicle M to travel at a reduced speed. For example, when the lane change determiner 142 determines that the lane change cannot be executed, the action plan generator 140 may determine a target speed value for causing the host vehicle M to be braked with a second amount of braking and causing the host vehicle M to travel at a reduced speed. The first amount of braking and the second amount of braking may be the same amount of braking or may be different amounts of braking.

When the lane change determiner 142 determines that the lane change cannot be executed and the obstacle determiner 134 determines that a specific obstacle is present in the traveling direction of the host vehicle M, the action plan generator 140 determines a target trajectory and a target speed value for which the host vehicle M travels in accordance with the degree of hindrance of the specific obstacle input from the obstacle determiner 134. More specifically, when the degree of hindrance input from the obstacle determiner 134 is greater than or equal to a predetermined degree required for avoiding the obstacle by stopping the host vehicle M, the action plan generator 140 determines the speed element of the target trajectory for causing the host vehicle M to be braked with a third amount of braking that has a larger braking force than the first amount of braking and the second amount of braking. When the degree of hindrance input from the obstacle determiner 134 is less than the predetermined degree, the action plan generator 140 generates a target trajectory along which at least a part of a vehicle body area (for example, a central portion) between two wheels mounted on the host vehicle M in the vehicle width direction passes above the specific obstacle so that the host vehicle M can travel while riding over the specific obstacle because a height of the specific obstacle is lower than a height of a minimum ground clearance of the host vehicle M. That is, the action plan generator 140 generates the target trajectory along which the host vehicle M travels while riding over the specific obstacle between both the wheels. The action plan generator 140 generates a target trajectory along which any position on the host vehicle M in the vehicle width direction passes above the specific obstacle when the degree of hindrance input from the obstacle determiner 134 is a degree at which the host vehicle M can travel while riding over the specific obstacle (a degree less than a predetermined degree) and is also less than or equal to a degree at which the host vehicle M can travel while making a tread on the specific obstacle because the specific obstacle is soft, thin, or light (hereinafter, a second degree). In other words, the action plan generator 140 generates a target trajectory along which at least one or all of the four wheels of the host vehicle M in the vehicle length direction pass above the specific obstacle. The action plan generator 140 maintains a current traveling state when the degree of hindrance input from the obstacle determiner 134 is a degree at which the host vehicle M can travel while making a tread on the specific obstacle (a degree less than the second degree) and is also less than or equal to a degree at which it is not necessary to avoid the specific obstacle (hereinafter, a third degree). That is, the action plan generator 140 does not newly generate a target trajectory according to the specific obstacle.

The second controller 160 controls the travel driving force output device 200, the brake device 210, and the steering device 220 so that the host vehicle M passes along the target trajectory generated by the action plan generator 140 at a scheduled time.

Returning to FIG. 2, the second controller 160 includes, for example, an acquirer 162, a speed controller 164, and a steering controller 166. The acquirer 162 acquires information of a target trajectory (a trajectory point) generated by the action plan generator 140 and causes the acquired information to be stored in a memory (not shown). The speed controller 164 controls the travel driving force output device 200 or the brake device 210 on the basis of speed elements associated with the target trajectory stored in the memory. The steering controller 166 controls the steering device 220 in accordance with a degree of curve of a target trajectory stored in the memory. For example, processes of the speed controller 164 and the steering controller 166 are implemented by a combination of feed-forward control and feedback control. As one example, the steering controller 166 executes feed-forward control according to the curvature of the road in front of the host vehicle M and feedback control based on a deviation from the target trajectory in combination.

The travel driving force output device 200 outputs a travel driving force (torque) for driving the vehicle to the drive wheels. The travel driving force output device 200 includes, for example, a combination of an internal combustion engine, an electric motor, a transmission, and the like, and an electronic control unit (ECU) that controls these components. The ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated by an operation of the brake pedal included in the driving operator 80 to the cylinder via a master cylinder as a backup. Also, the brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor to change the direction of the steerable wheels in accordance with the information input from the second controller 160 or the information input from the driving operator 80.

[Physical Object Recognition, Determination, and Target Trajectory Generation Process]

Figure 3:
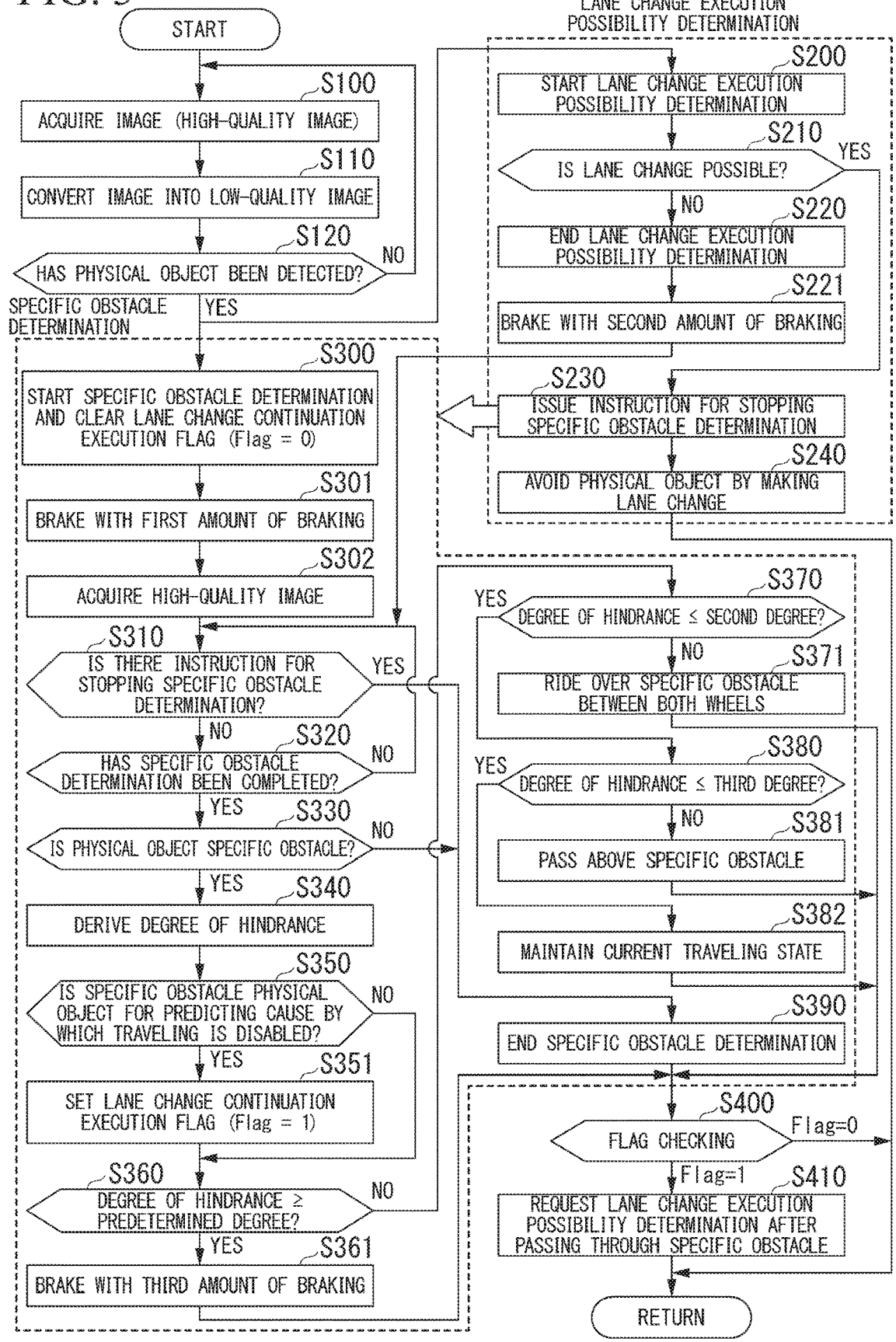
FIG. 3 is a flowchart showing an example of a flow of a process to be executed by a physical object recognizer, an obstacle determiner, an action plan generator, and a lane change determiner according to the embodiment.

Hereinafter, a cooperative relationship of physical object recognition and determination processes to be implemented by the physical object recognizer 132 and the obstacle determiner 134 and a process of generating a target trajectory along which the host vehicle M travels in the future and determining a target speed value to be implemented by the lane change determiner 142 and the action plan generator 140 will be described. FIG. 3 is a flowchart showing an example of a flow of a process to be executed by the physical object recognizer 132, the obstacle determiner 134, the action plan generator 140, and the lane change determiner 142 according to the embodiment.

The physical object recognizer 132 acquires an image IM captured by the camera 10 (step S100). The physical object recognizer 132 converts the acquired image IM into a low-quality image IML (step S110). Subsequently, the physical object recognizer 132 detects and recognizes a physical object present on a route of the host vehicle M shown in the low-quality image IML obtained through the conversion. The physical object recognizer 132 checks whether or not the physical object present on the route of the host vehicle M has been recognized (step S120). When the physical object present on the route of the host vehicle M has not been recognized in step S120, the physical object recognizer 132 returns the process to step S100 and iterates the recognition of the physical object present on the route of the host vehicle M at predetermined time intervals.

On the other hand, when the physical object present on the route of the host vehicle M has been recognized in step S120, the physical object recognizer 132 outputs information indicating that the physical object has been recognized to the obstacle determiner 134 and the lane change determiner 142. The physical object recognizer 132 outputs information indicating the physical object recognition area A within the low-quality image IML in which the recognized physical object is present to the obstacle determiner 134. Thereby, the obstacle determiner 134 starts a specific obstacle determination process of determining a specific obstacle from step S300 and the lane change determiner 142 starts a lane change execution possibility determination process of determining the possibility of execution of a lane change from step S200. The obstacle determiner 134 and the lane change determiner 142 execute processes in parallel in cooperation with each other.

First, the lane change execution possibility determination process to be executed by the lane change determiner 142 will be described. When the lane change execution possibility determination process starts in step S200, the lane change determiner 142 determines whether or not the execution of the lane change is possible by checking a surrounding environment of the host vehicle M (step S210). When it is determined that the execution of the lane change is possible in step S210, the lane change determiner 142 outputs an instruction for stopping a specific obstacle determination process which is being executed to the obstacle determiner 134 (step S230). In other words, the lane change determiner 142 issues an instruction for stopping a process of determining a specific obstacle to be executed by the obstacle determiner 134 and a process of generating a target trajectory according to the specific obstacle in the action plan generator 140. The action plan generator 140 generates a target trajectory for making a lane change to avoid the physical object recognized by the physical object recognizer 132 in accordance with a result of determining that the execution of the lane change is possible in the lane change determiner 142 (step S240).

On the other hand, when it is determined that the execution of the lane change is impossible in step S210, the lane change determiner 142 ends the lane change execution possibility determination process that is currently being executed (step S220). The action plan generator 140 determines a target speed value for causing the host vehicle M to be braked and decelerated with the second amount of braking in accordance with the determination result indicating that the execution of the lane change is impossible in the lane change determiner 142 (step S221).

Next, the specific obstacle determination process to be executed by the obstacle determiner 134 will be described. When the specific obstacle determination process starts in step S300, the obstacle determiner 134 clears a lane change continuation execution flag (Flag=0). The action plan generator 140 determines a target speed value for causing the host vehicle M to be braked and decelerated with the first amount of braking (step S301). The obstacle determiner 134 acquires an image IM captured by the camera 10, i.e., a high-quality image IMH (step S302). Thereafter, the obstacle determiner 134 performs a detailed analysis process on a physical object present in an area corresponding to the physical object recognition area A within the high-quality image IMH on the basis of information of a position of the physical object recognition area A output from the physical object recognizer 132.

The obstacle determiner 134 checks whether or not there is an instruction for stopping the specific obstacle determination process, i.e., whether or not the lane change determiner 142 determines that the execution of the lane change is possible (step S310). When it is determined that there is an instruction for stopping the specific obstacle determination process in step S310, the obstacle determiner 134 moves the process to step S390. The obstacle determiner 134 ends the specific obstacle determination process (step S390). The action plan generator 140 moves the process to step S400.

On the other hand, when it is checked that there is no instruction for stopping the specific obstacle determination process in step S310, the obstacle determiner 134 checks whether or not the determination of the specific obstacle has been completed, i.e., whether or not the detailed analysis process on the physical object has been completed (step S320). When the determination of the specific obstacle has not been completed in step S320, the obstacle determiner 134 returns the process to step S310 and continues the process of determining the specific obstacle.

On the other hand, when the determination of the specific obstacle has been completed in step S320, the obstacle determiner 134 checks whether or not the physical object recognized by the physical object recognizer 132 has been determined to be the specific obstacle (step S330). When the physical object recognized by the physical object recognizer 132 has been determined not to be the specific obstacle in step S330, the obstacle determiner 134 moves the process to step S390 and ends the process of determining the specific obstacle. The action plan generator 140 moves the process to step S400.

On the other hand, when the physical object recognized by the physical object recognizer 132 has been determined to be the specific obstacle in step S330, the obstacle determiner 134 derives a degree of hindrance of the determined specific obstacle (step S340). The obstacle determiner 134 outputs the result of determining the specific obstacle and the derived degree of hindrance to the action plan generator 140.

The action plan generator 140 checks whether or not the specific obstacle determination result or the degree of hindrance output from the obstacle determiner 134 includes information indicating that the specific obstacle is a physical object for predicting a cause by which traveling is disabled (step S350). When the information indicating that the specific obstacle is a physical object for predicting a cause by which traveling is disabled is included in step S350, the action plan generator 140 sets a lane change continuation execution flag (Flag=1) (step S351). The action plan generator 140 moves the process to step S360.

On the other hand, when the information indicating that the specific obstacle is a physical object for predicting a cause by which traveling is disabled is not included in step S350, the action plan generator 140 checks whether or not the degree of hindrance output from the obstacle determiner 134 is greater than or equal to a predetermined degree (step S360). When the degree of hindrance is greater than or equal to the predetermined degree in step S360, the action plan generator 140 determines a target speed value for causing the host vehicle M to be braked with the third amount of braking (step S361). Then, the action plan generator 140 moves the process to step S400.

On the other hand, when the degree of hindrance is less than the predetermined degree in step S360, the action plan generator 140 checks whether or not the degree of hindrance is less than or equal to the second degree (step S370). When the degree of hindrance exceeds the second degree in step S370, the action plan generator 140 generates a target trajectory for riding over the specific obstacle between the two wheels of the host vehicle M (step S371). Then, the action plan generator 140 moves the process to step S400.

On the other hand, when the degree of hindrance is less than or equal to the second degree in step S370, the action plan generator 140 checks whether or not the degree of hindrance is less than or equal to the third degree (step S380). When the degree of hindrance exceeds the third degree in step S380, the action plan generator 140 permits the generation of a target trajectory along which the host vehicle M passes above the specific obstacle, i.e., at least one of the wheels of the host vehicle M travels while making a tread on the specific obstacle (step S381). For example, if the specific obstacle is a rope or the like having a predetermined length or more, the degree of hindrance may exceed the third degree. In this case, the host vehicle M does not need to take an action to largely avoid the specific obstacle and at least one or all of the four wheels of the host vehicle M in the vehicle length direction travel while making a tread on the specific obstacle, so that it is possible to avoid an unnecessary increase in risk. Thus, the action plan generator 140 generates a target trajectory along which one or both of the two wheels of the host vehicle M in the vehicle width direction travel while stepping over the specific obstacle. The action plan generator 140 moves the process to step S400.

On the other hand, when the degree of hindrance is less than or equal to the second degree in step S380, the action plan generator 140 causes the current traveling state of the host vehicle M to be maintained without newly generating the target trajectory according to the specific obstacle (step S382). Then, the action plan generator 140 moves the process to step S400.

Next, the action plan generator 140 checks the lane change continuation execution flag (step S400). When the lane change continuation execution flag is not set (Flag=0) in step S400, the action plan generator 140 ends the current process.

On the other hand, when the lane change continuation execution flag is set (Flag=1) in step S400, the action plan generator 140 requests the lane change determiner 142 to newly execute the lane change execution possibility determination process after the host vehicle M passes through the specific obstacle (step S410). Thereby, the lane change determiner 142 starts the lane change execution possibility determination process of determining the lane change execution possibility newly (again) in response to a request from the action plan generator 140. The action plan generator 140 ends the current process.

[Example of Scene for Performing Physical Object Recognition, Determination, and Target Trajectory Generation Process]

Figure 4:
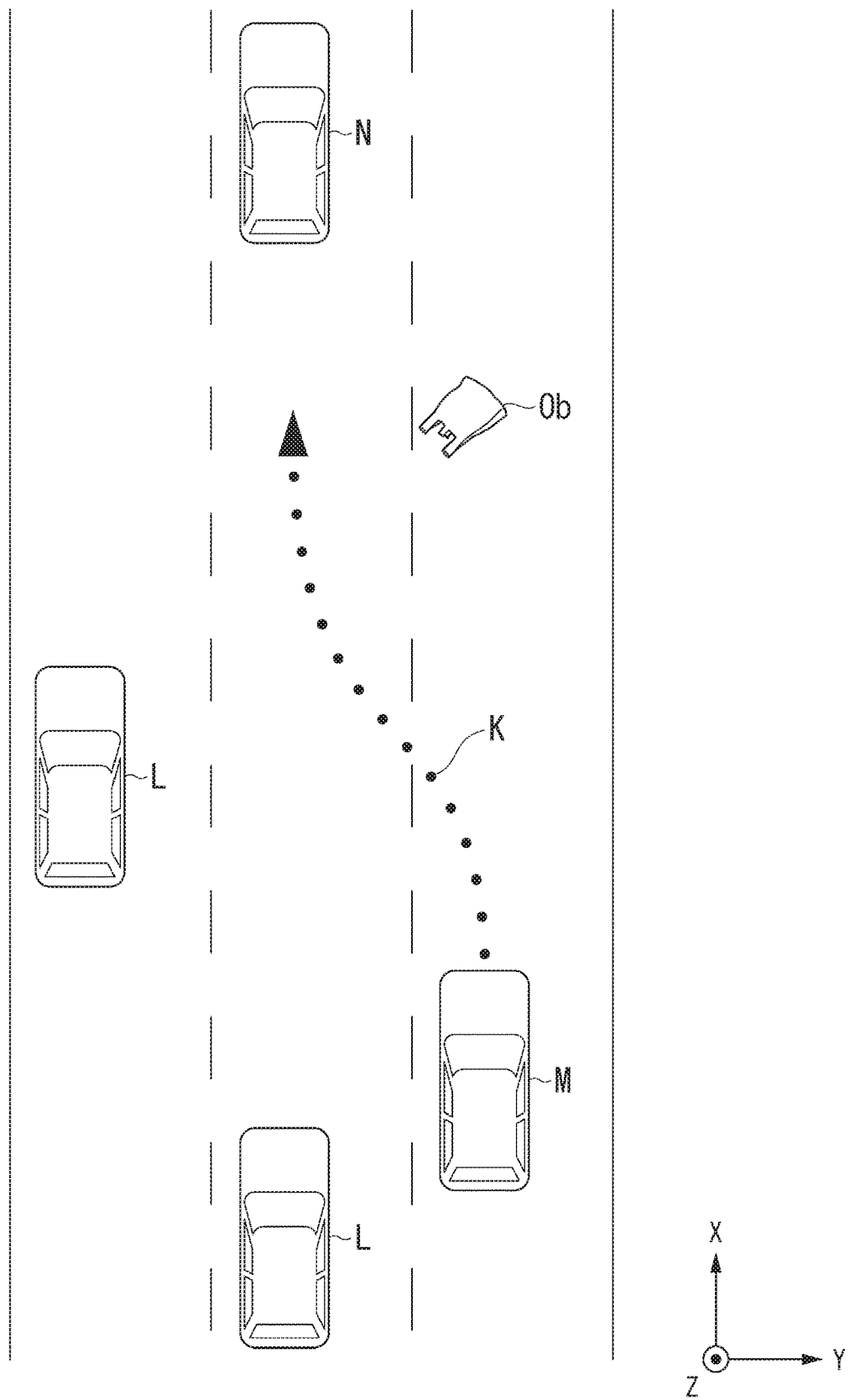
FIG. 4 is a diagram showing an example of a scene that a host vehicle is likely to encounter according to the embodiment.
Figure 5:
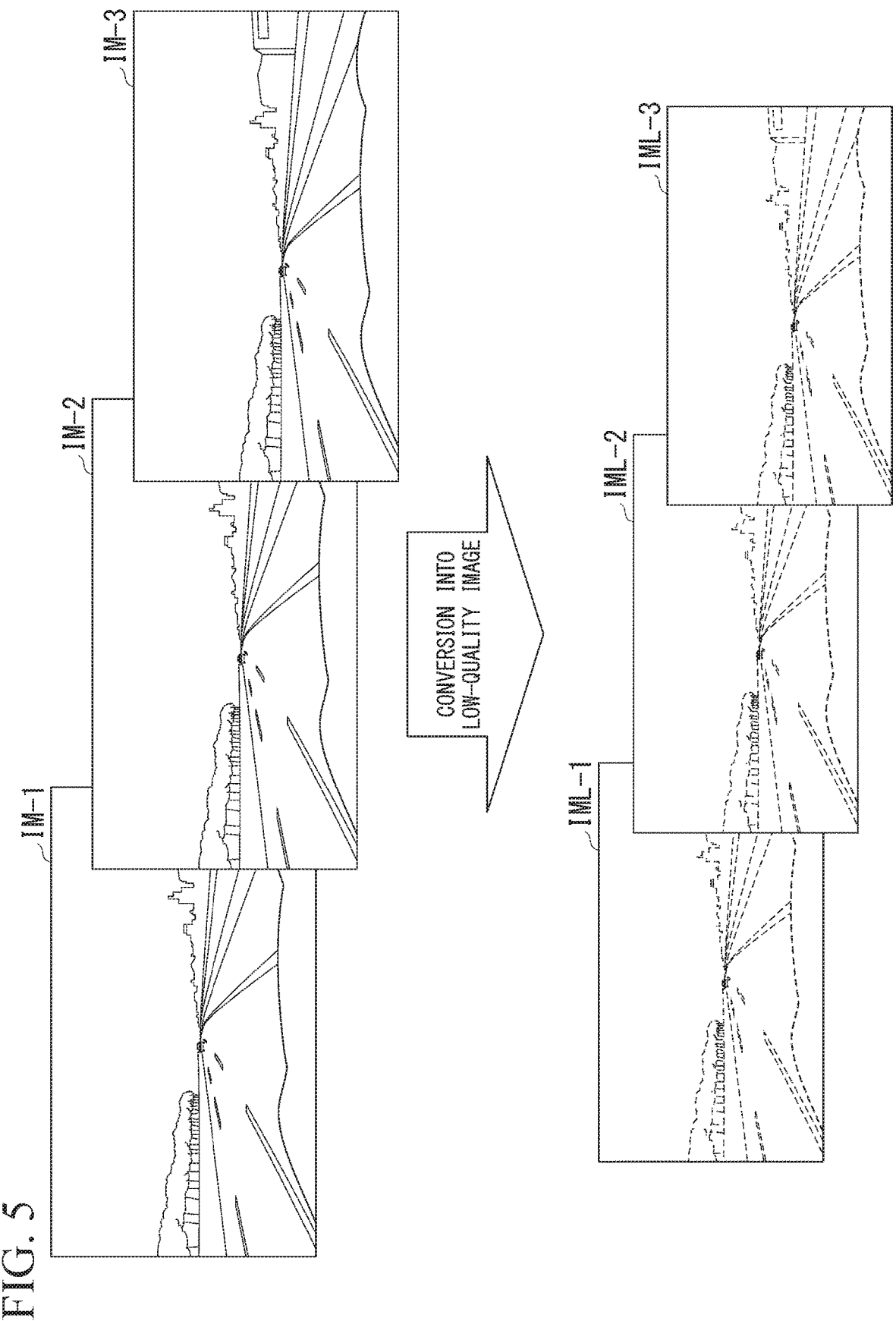
FIG. 5 is a diagram showing an example of an image used for a physical object recognition process in the physical object recognizer according to the embodiment.
Figure 6:
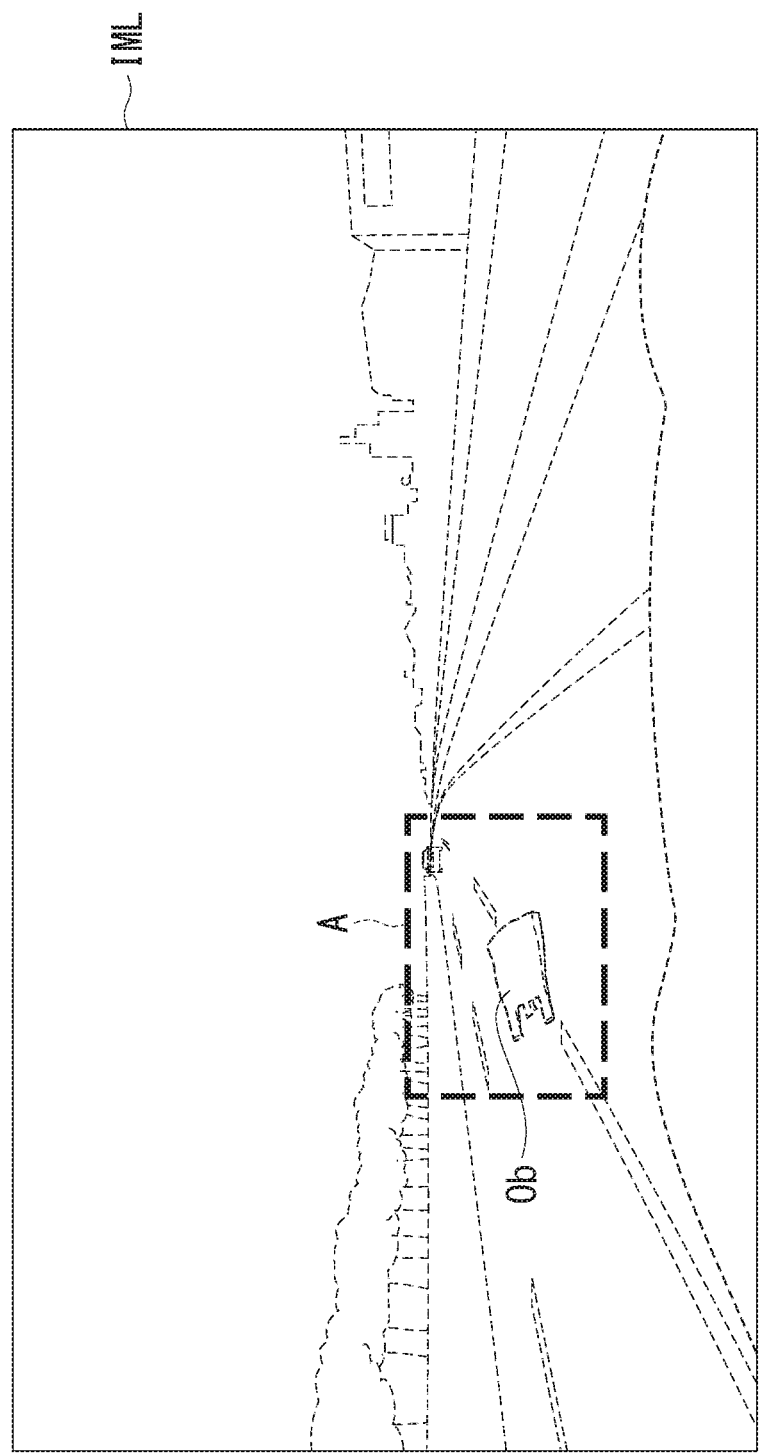
FIG. 6 is a diagram showing an example of a low-quality image obtained by recognizing a physical object in the physical object recognizer according to the embodiment.
Figure 7:
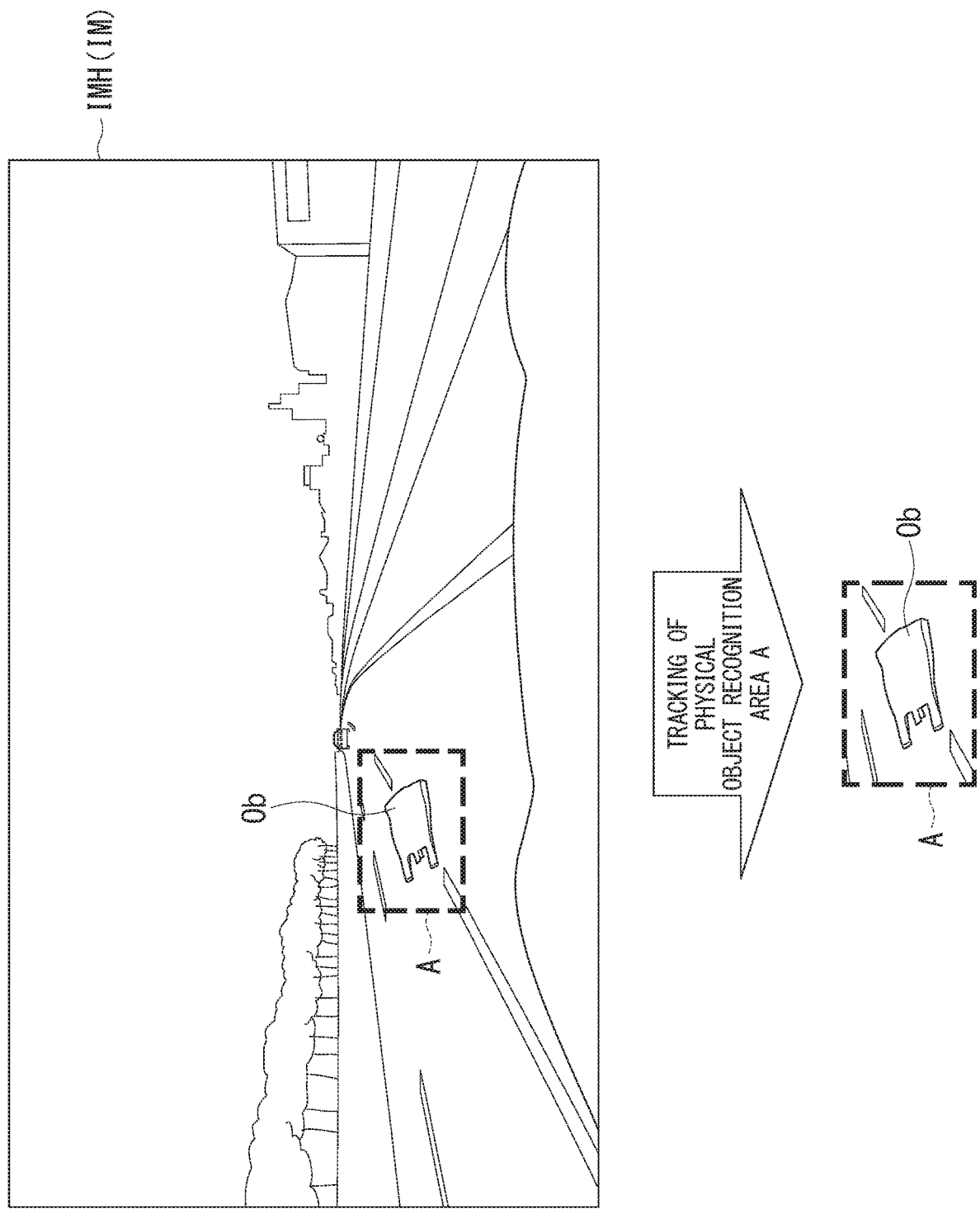
FIG. 7 is a diagram showing an example of an image used for a detailed analysis process on a physical object in the obstacle determiner according to the embodiment.

In the following description, scenes in which a process of recognizing a physical object, a process of determining a physical object, and a process of generating a target trajectory and determining a target speed value will be described with reference to FIGS. 4 to 7. FIG. 4 is a diagram showing an example of a scene that the host vehicle M is likely to encounter according to the embodiment. FIG. 5 is a diagram showing an example of an image used for a physical object recognition process in the physical object recognizer 132 according to the embodiment. FIG. 6 is a diagram showing an example of a low-quality image IML obtained by recognizing a physical object in the physical object recognizer 132 according to the embodiment. FIG. 7 is a diagram showing an example of an image used for a detailed analysis process on a physical object in the obstacle determiner 134 according to the embodiment.

FIG. 4 shows an example of a case in which the host vehicle M traveling on the rightmost side of three lanes on each side recognizes a specific obstacle Ob present on a route. In this scene, before the specific obstacle Ob is recognized, the physical object recognizer 132 detects and recognizes a physical object in a state in which the processing load is reduced by converting images IM acquired in time series from the camera 10 into low-quality images IML. FIG. 5 shows an example of a case in which the physical object recognizer 132 sequentially acquires images IM-1, IM-2, and IM-3 from the camera 10 in time series and converts the images IM into low-quality image IML-1, IML-2, and IML-3. The physical object recognizer 132 performs a process of acquiring the images IM from the camera 10 at predetermined time intervals while the host vehicle M is traveling and detecting and recognizing a physical object present on the route on the basis of each acquired image IM.

Subsequently, when the host vehicle M continues to travel and recognizes the specific obstacle Ob as the physical object, the physical object recognizer 132 outputs information indicating that the physical object has been recognized to the obstacle determiner 134 and the lane change determiner 142. The physical object recognizer 132 outputs information indicating a physical object recognition area A within the low-quality image IML in which the recognized physical object is present to the obstacle determiner 134. FIG. 6 shows an example of the specific obstacle Ob recognized by the physical object recognizer 132 and a position of the physical object recognition area A where the specific obstacle Ob is present.

Thereby, the obstacle determiner 134 and the lane change determiner 142 execute the processes in parallel. When information indicating that the physical object has been recognized is input from the physical object recognizer 132, the lane change determiner 142 starts a lane change execution possibility determination for avoiding the physical object recognized by the physical object recognizer 132. When the lane change determiner 142 determines that the lane change is possible, the action plan generator 140 avoids the specific obstacle Ob by preferentially making the lane change. FIG. 4 shows an example of a target trajectory in which trajectory points K at which the host vehicle M is required to arrive are sequentially arranged when the specific obstacle Ob is avoided by making the lane change.

On the other hand, when the information indicating that the physical object has been recognized is input from the physical object recognizer 132, the obstacle determiner 134 acquires the high-quality image IMH and starts a detailed analysis process on an area for the physical object recognition area A where a physical object recognized by the physical object recognizer 132 is present within the high-quality image IMH and the specific obstacle determination on the physical object within the area. FIG. 7 shows an example of the specific obstacle Ob shown in the high-quality image IMH and an area corresponding to the physical object recognition area A within the high-quality image IMH. The obstacle determiner 134 tracks the physical object recognition area A within the high-quality image IMH and performs a detailed analysis process on the tracked area. When the lane change determiner 142 determines that the lane change is impossible, the action plan generator 140 causes the host vehicle M to pass through a position where the specific obstacle Ob is present on the basis of the determination result of the obstacle determiner 134.

As described above, according to the automated driving control device 100 of the embodiment, the physical object recognizer 132 recognizes a physical object with a small load by converting a plurality of time-series images IM acquired from the camera 10 into low-quality images IML. According to the automated driving control device 100 of the embodiment, when the physical object recognizer 132 has recognized the physical object, the lane change possibility determination of the lane change determiner 142 and detailed analysis on a physical object and the determination of whether or not the physical object is a specific obstacle in the obstacle determiner 134 are performed in parallel. In other words, in the automated driving control device 100 according to the embodiment, it is possible to suitably cause physical object detection and driving control to be in cooperation with each other by making a determination of possibility of a lane change for avoiding the physical object in parallel with the determination of the physical object present in a direction in which the host vehicle M travels made in two steps. Thereby, in the automated driving control device 100 according to the embodiment, the action plan generator 140 can cause the host vehicle M to travel by generating a more appropriate target trajectory according to a physical object present on a traveling route of the host vehicle M (a target trajectory for avoiding a physical object, decelerating the host vehicle M, and passing through a position of the physical object).

[Hardware Configuration]

Figure 8:
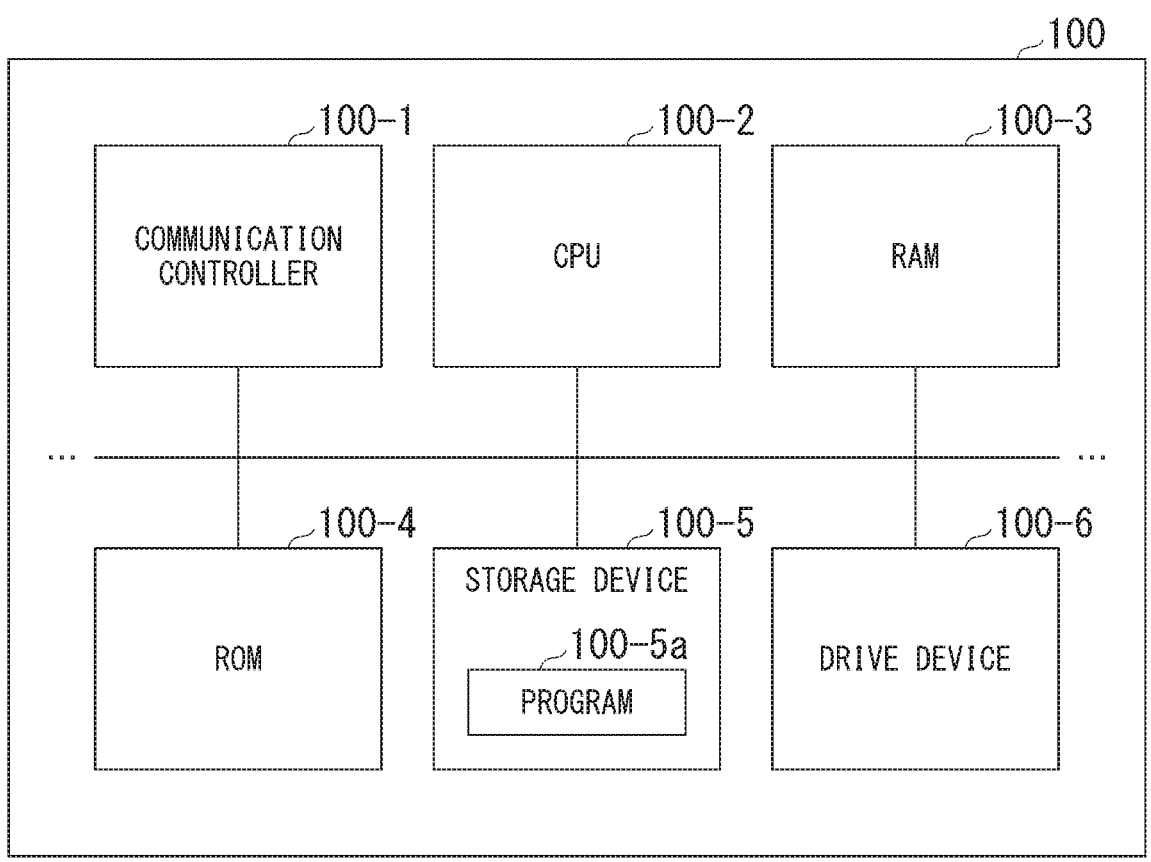
FIG. 8 is a diagram showing an example of a hardware configuration of an automated driving control device according to the embodiment.

FIG. 8 is a diagram showing an example of a hardware configuration of the automated driving control device 100 according to the embodiment. As shown in FIG. 8, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. The storage device 100-5 stores a program 100-5a to be executed by the CPU 100-2. This program is loaded to the RAM 100-3 by a direct memory access (DMA) controller (not shown) or the like and executed by the CPU 100-2. Thereby, some or all of the first controller 120 and the second controller 160, more specifically, the physical object recognizer 132, the obstacle determiner 134, the lane change determiner 142, and the action plan generator 140, are implemented.

The embodiment described above can be represented as follows.

A vehicle control device including:
a storage device storing a program; and
a hardware processor,
wherein the hardware processor executes the program stored in the storage device to:
recognize a surrounding environment of a vehicle;

perform driving control according to speed control and steering control of the vehicle on the basis of a recognition result;

recognize a physical object present on a route of the vehicle on the basis of an image acquired from an imaging unit configured to image a space in a traveling direction of the vehicle;

determine whether or not the recognized physical object is a specific obstacle that hinders traveling in a lane where the vehicle is currently traveling; and start a lane change execution possibility determination before the determination is made or simultaneously with a start of the determination in a case where the physical object has been recognized and the vehicle is allowed to make the lane change.

Although modes for carrying out the present invention have been described using embodiments, the present invention is not limited to the embodiments, and various modifications and substitutions can also be made without departing from the scope and spirit of the present invention.

What is claimed is:

1. A vehicle control device comprising a processor configured to:

recognize a surrounding environment of a vehicle; and perform driving control according to speed control and steering control of the vehicle on the basis of a recognition result, wherein the processor is further configured to:

recognize a physical object present on a route of the vehicle on the basis of an image acquired from a camera configured to image a space in a traveling direction of the vehicle; and determine whether or not the physical object is a specific obstacle that hinders traveling in a lane where the vehicle is currently traveling, wherein the processor is further configured to start a lane change execution possibility determination before the determination is made or simultaneously with a start of the determination in a case where the physical object has been recognized and the vehicle is allowed to make the lane change, wherein the processor is further configured to start braking of the vehicle with a first amount of braking in a case where the determination has been started, and wherein the processor is further configured to:

derive a degree of hindrance at which the specific obstacle hinders the traveling of the vehicle in a case where the physical object is determined to be the specific obstacle; and brake the vehicle with a second amount of braking that has a larger braking force than the first amount of braking in a case where the degree of hindrance is greater than or equal to a predetermined degree.

2. The vehicle control device according to claim 1, wherein the processor is configured to cause the determination to be stopped in a case where a result of the lane change execution possibility determination indicates that the lane change is determined to be executed.

3. The vehicle control device according to claim 1, wherein the processor is configured to start braking of the vehicle with a third amount of braking in a case where a result of the lane change execution possibility determination indicates that execution of the lane change is determined to be impossible.

4. The vehicle control device according to claim 1, wherein the processor is configured to cause the vehicle to travel under a condition that a central portion of the vehicle in a vehicle width direction passes above the specific obstacle in a case where the degree of hindrance is less than the predetermined degree.

5. The vehicle control device according to claim 4, wherein the processor is configured to permit the traveling of the vehicle under a condition that any position on the vehicle in the vehicle width direction passes above the specific obstacle in a case where the degree of hindrance is less than the predetermined degree and is also less than or equal to a predetermined second degree.

6. The vehicle control device according to claim 4, wherein the processor is configured to resume the lane change execution possibility determination in a case where it is determined that the physical object is a physical object for predicting as a cause by which traveling is disabled in front of the vehicle in the traveling direction.

7. A vehicle control method using a computer comprising:

recognizing a surrounding environment of a vehicle;

performing driving control according to speed control and steering control of the vehicle on the basis of a recognition result;

recognizing a physical object present on a route of the vehicle on the basis of an image acquired from a camera configured to image a space in a traveling direction of the vehicle;

determining whether or not the recognized physical object is a specific obstacle that hinders traveling in a lane where the vehicle is currently traveling; and starting a lane change execution possibility determination before the determination is made or simultaneously with a start of the determination in a case where the physical object has been recognized and the vehicle is allowed to make the lane change, wherein the vehicle control method further comprises:

starting braking of the vehicle with a first amount of braking in a case where the determination has been started;

deriving a degree of hindrance at which the specific obstacle hinders the traveling of the vehicle in a case where the physical object is determined to be the specific obstacle; and braking the vehicle with a second amount of braking that has a larger braking force than the first amount of braking in a case where the degree of hindrance is greater than or equal to a predetermined degree.

8. A computer-readable non-transitory storage medium storing a program for causing a computer of a vehicle control device to:

recognize a surrounding environment of a vehicle;

perform driving control according to speed control and steering control of the vehicle on the basis of a recognition result;

recognize a physical object present on a route of the vehicle on the basis of an image acquired from a camera configured to image a space in a traveling direction of the vehicle;

determine whether or not the recognized physical object is a specific obstacle that hinders traveling in a lane where the vehicle is currently traveling; and start a lane change execution possibility determination before the determination is made or simultaneously with a start of the determination in a case where the physical object has been recognized and the vehicle is allowed to make the lane change, wherein the program causes the computer to:

start braking of the vehicle with a first amount of braking in a case where the determination has been started;

derive a degree of hindrance at which the specific obstacle hinders the traveling of the vehicle in a case where the physical object is determined to be the specific obstacle; and brake the vehicle with a second amount of braking that has a larger braking force than the first amount of braking in a case where the degree of hindrance is greater than or equal to a predetermined degree.

* * * * *